INVENTOR
FREDERICK WILLIAM ODDY

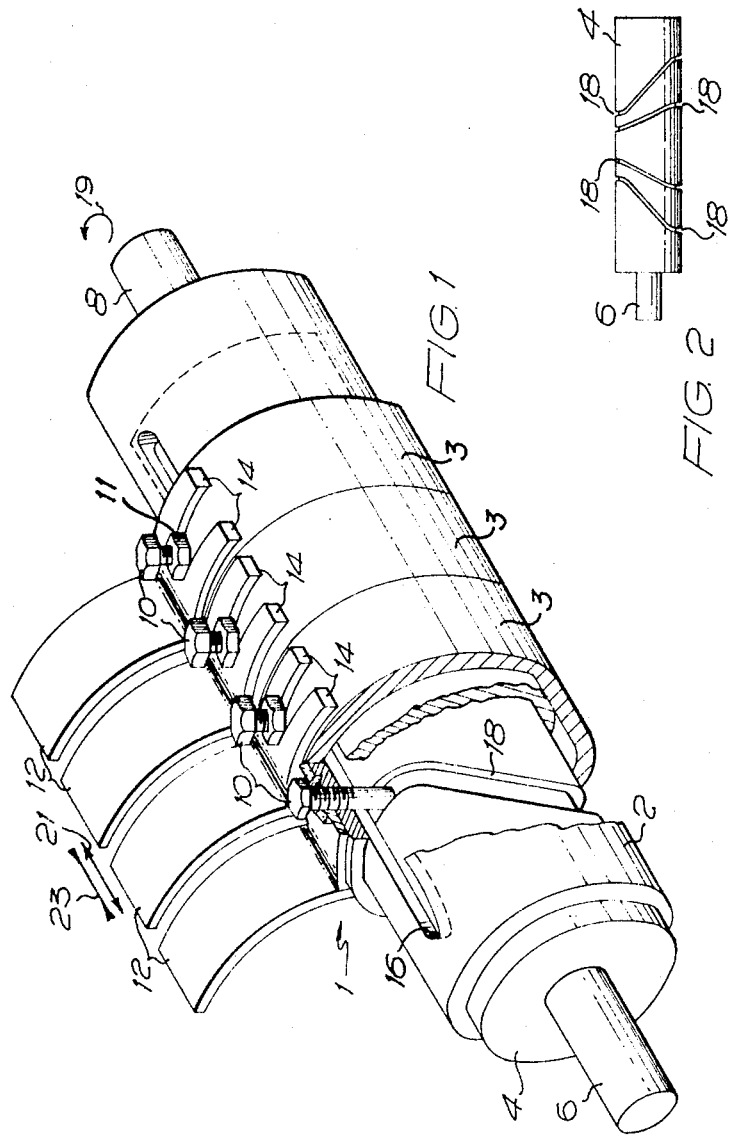

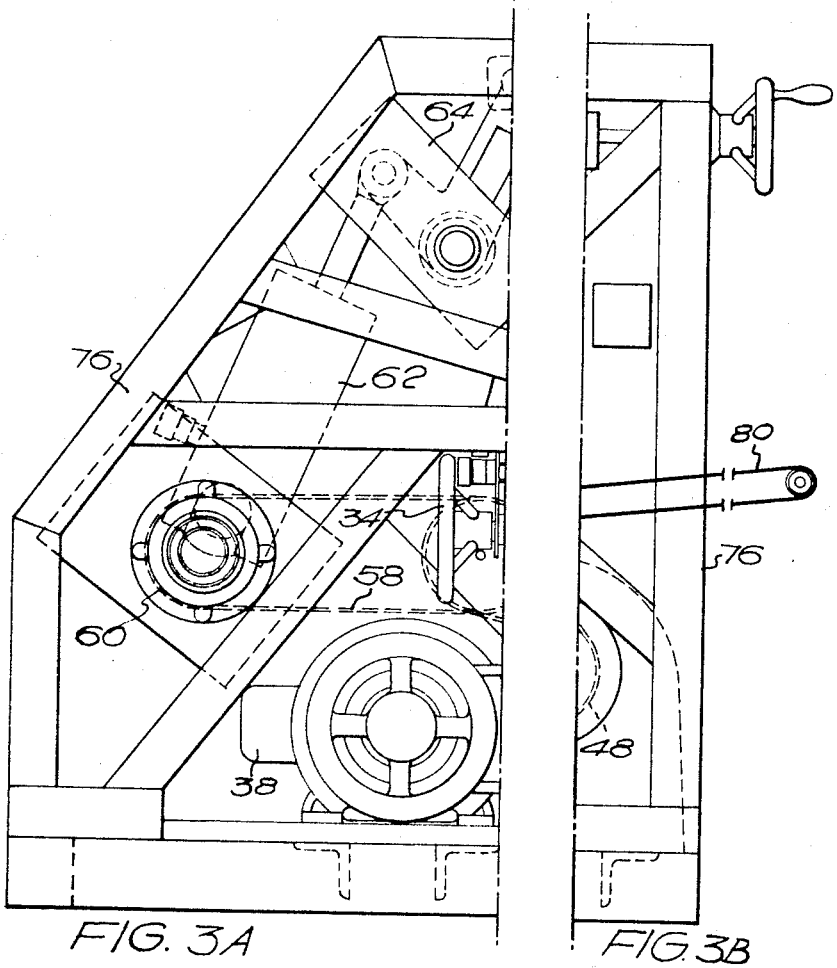

United States Patent Office 3,446,161
Patented May 27, 1969

3,446,161
APPARATUS FOR TRANSFERRING DOUGH FROM A SUPPLY SOURCE TO A RECEIVING STATION
Frederick W. Oddy, Leeds, England, assignor to Oddy Engineering Limited, Yorkshire, England, a British company
Filed Aug. 21, 1967, Ser. No. 662,092
Claims priority, application Great Britain, Sept. 16, 1966, 41,387/66
Int. Cl. A21c; B65g 47/26
U.S. Cl. 107—15                    7 Claims

ABSTRACT OF THE DISCLOSURE

Apparatus for transferring dough from a supply source to a receiving station during processing between one machine and another prior to baking the completely processed dough comprising an inner stationary drum, an outer sleeve rotatable about the stationary drum, a plurality of rings mounted on the outer sleeve which slide axially thereon and a dough receiving finger carried by each of the rings. The fastener for the finger on the associated ring is threaded at the top and unthreaded at the bottom of the shank which extends through the outer sleeve and fits into an endless cam track on the inner drum. A locking nut serves to vary the spacing between the rings and the fingers in the axial direction of the sleeve.

---

This invention relates to apparatus for use in the bakery industry and is particularly concerned with apparatus for receiving and transferring dough or paste from one processing machine to another prior to the dough or paste entering the baking ovens.

One particular application of apparatus according to the invention is the receipt and transfer of dough or paste from a divider to a moulder. It is customary practice to effect such receiving and transfer by hand, but this involves a great deal of time and labour which is extremely costly.

The present invention therefore seeks to obviate the above disadvantages by providing a power-operated receiving and transfer means which is simple and economical to operate, and which will speed up the above-described operation.

Accordingly, the present invention provides apparatus for transferring dough or paste from a first position to a second position during processing, said apparatus comprising power-operated means adapted to receive a plurality of pieces of dough or paste in spaced relationship from a supply source and to transfer said pieces of dough or paste to receiving means, said spaced relationship being increased or decreased during said transfer.

In order that the invention may be more readily understood, a preferred embodiment of the invention will now be described by way of example, reference being made to the accompanying drawings, in which:

FIGURE 1 is a perspective view, partly in section, of apparatus according to the invention;

FIGURE 2 is a view of part of FIGURE 1 drawn to a smaller scale; and FIGURES 3, 3A and 3B are fragmentary views of a combined dividing and moulding machine incorporating the apparatus of FIGURES 1 and 2, said FIGURE 3 being adapted to be placed between FIGURES 3A and 3B to illustrate the complete machine.

Figure 3:
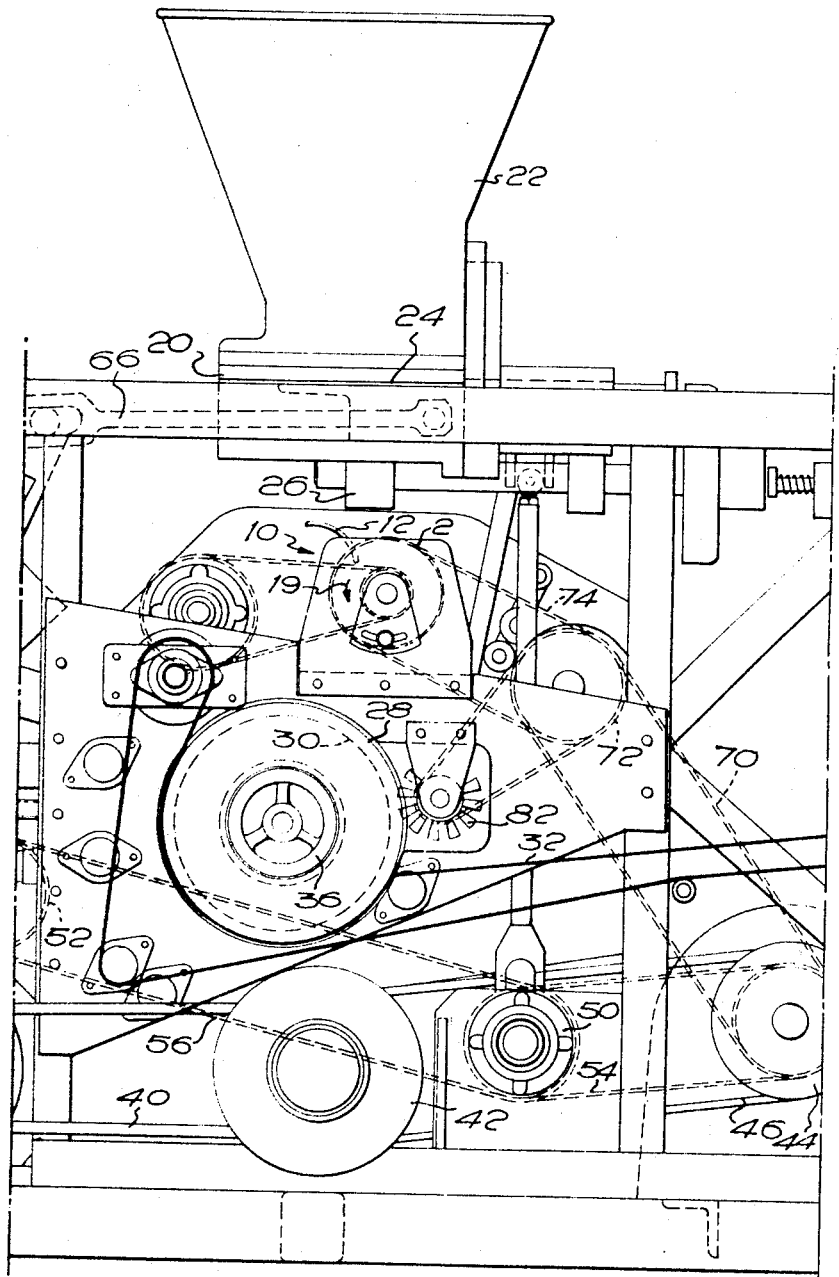

Referring to the drawings and firstly to FIGURES 1 and 2, the receiving and transfer mechanism, indicated generally by reference numeral 1, includes an outer rotatable sleeve 2 in which is located an inner stationary drum 4. The drum 4 carries an end shaft 6 by which it is supported in means (not shown) and the sleeve 2 is driven by means of a shaft 8 from a prime mover such as an electromotor, not shown in said FIGURES 1 and 2.

Each of the rings 3 has secured thereto, by fasteners 10 threaded at the upper ends of their shanks a lock nut 11 and a finger 12, the outer receiving surface of which is arcuate in shape and whose surface bearing on the ring 3 is bifurcated as indicated at 14 for purposes of adjustment. The sleeve 2 is provided with a longitudinal slot 16 which extends fully through the wall of the sleeve 2.

The lower ends of the fasteners 10 are not threaded and extend through the slot 16 and their lower ends freely engage in cam tracks 18 located in the periphery of the inner stationary drum 4. Each of the cam tracks 18 is endless and, when the sleeve 2 is rotated, the fasteners 10 run in the cam track and move the rings 3 and the fingers 12 axially of the sleeve 2.

FIGURE 3 of the drawings shows the above-described receiving and transfer mechanism 1 in a combined dough divider and moulding machine. Said machine comprises a dough or paste divider 20 having an entry hopper 22 adapted to receive dough or paste from a supply source, not shown. The divider 20 has means 24 therein for dividing the dough or paste into a plurality of pieces which leave the divider 20 in spaced relationship through an exit 26 to be held by the receiving and transfer mechanism as will be explained hereinafter.

Located beneath the receiving and transfer mechanism is a moulding roller which comprises an outer rotatable shell 28 having a plurality of pockets or holes (not shown) which extend through the wall of the shell 28, and an inner vibratory cylinder shown in dotted lines by reference numeral 30. The moulding roller is engageable by an endless belt 32 which passes around part of the periphery of the outer rotatable shell 28 and which extends to a point outside the confines of the apparatus. A handwheel 34 is provided for regulating the tension of the endless belt 32, and a handwheel 36 is provided for longitudinal adjustment of the vibratory cylinder 30 relative to the outer shell 28.

The divider 20, receiving and transfer mechanism 1 and the moulding roller are synchronized such that the operation of each takes place at the correct time. To this end, there is provided a common source of power in the form of an electromotor 38 which through the intermediary of an endless belt 40 is adapted to cause rotation of a pulley wheel 42. The pulley wheel 42 rotates a second pulley wheel 44 via an endless belt 46.

In order to drive the divider 20, the pulley wheel 44 carries a gear wheel 48 which via gear wheels 50, 52, and endless chains 54, 56 and 58 is adapted to cause rotation of a gear wheel 60. The gear wheel 60 carries a member 62 on the opposite end of which is a bell crank lever 64 which carries a slidable arm 66 which extends into the divider 20.

For driving the receiving and transfer mechanism 1, an endless chain 70 is taken from a second gear wheel carried by pulley wheel 44 to a gear wheel 72 which via a further endless chain 74 causes rotation of the shaft 8 of the outer shell 2 of the receiving and transfer mechanism 1.

The divider 20, receiving and transfer mechanism 1 and moulding roller together with the ancillary equipment are mounted in a rigid frame, indicated generally by reference numeral 76.

In operation, the electromotor 38 is actuated which, through the intermediary of the various gear wheels, chains and pulleys, causes operation of the divider 20, receiving and transfer mechanism 1 and the moulding roller. Bulk dough or paste (not shown) is fed into the hopper 22 of the divider 20 and passes to the dividing means where the dough or paste is formed into a plurality of pieces, the division being accomplished by movement of the arm 66. The pieces of dough (four at a time) then leave the divider 20 through the exit 26 in spaced relationship whereupon they fall into the fingers 12 of the receiving and transfer mechanism 1.

Rotation of the outer sleeve 2 of said mechanism in the direction of arrow 19 causes the fingers 12 to rotate in the same direction due to the shanks of the fasteners 10 passing through the slot 16 (FIGURE 1).

During rotation of the sleeve 2 and fingers 12, said shanks follow the paths of the endless cam tracks 18, thereby causing the fingers 12 to move away from one another in the direction of arrow 21 (FIGURE 1), the longitudinal displacement of the fingers 12 being accommodated by the longitudinal slot 16.

Rotation of the sleeve 2 and fingers 12 continues until the fingers 12 reach the position shown in FIGURE 3 so that the pieces of dough or paste fall into the pockets or holes in the outer rotatable shell of the moulding roller, at which point the spaced relationship of the pieces of dough or paste has been increased by virtue of the longitudinal displacement of the fingers 12. The fingers 12 then continue to rotate in the same direction, i.e. in the direction of arrow 19 until they again reach top dead centre in readiness for the commencement of the next operational cycle, the shanks of the fasteners 10 being guided in the cam tracks 18 such that the fingers 12 move in the direction of arrow 23 to revert the fingers 12 to their original spaced relationship.

Simultaneously with the continued rotation of the fingers 12, the pieces of dough or paste received by the moulding roller are engaged by the endless belt 32 which, in combination with vibratory cylinder 30 moulds said pieces to the desired shape. The shaped pieces of dough or paste then move onto the endless belt 32 and are conveyed to the end 80 thereof, where said pieces are transferred to other apparatus (not shown) for transfer to the baking ovens or to other processing apparatus.

A rotary brush 82 driven from the gear wheel 72 is provided so as to bear against the periphery of the outer shell of the moulding roller to remove from the latter any material which may become attached thereto during the operation.

It will be seen that with a receiving and transfer mechanism according to the invention, the processing of dough or paste prior to baking is greatly speeded up and is continuous, and that handling of the dough or paste during the process is entirely eliminated.

It should be understood that whilst the receiving and transfer mechanism has been described as being located in a combined divider and moulder, this need not necessarily be the case, since the mechanism could be located between two separate machines. It should also be understood that the receiving and transfer mechanism could decrease the spaced relationship of the pieces of dough or paste instead of increasing the spaced relationship if so desired. Finally, instead of the fingers 12 rotating through 360°, they could rotate through a predetermined arc and return to their original positions along the same path, in which case the cam tracks 18 will each terminate at a predetermined position.

I claim:
1. Apparatus for transferring dough from a supply source to a receiving station during processing between one machine and another prior to baking, said apparatus comprising an inner stationary drum, an outer rotatable sleeve located on said stationary drum, a plurality of axially slidable rings mounted on said sleeve, a dough-receiving finger carried by each of said rings, an adjustable fastener mounting each said finger on the associated ring, each fastener having a shank extending through said outer sleeve, and endless cam tracks in said inner drum in which the shanks of said fasteners are located and which serve on rotation of said sleeve to vary the spacing between said rings and said fingers in a direction axially of said sleeve.
2. Apparatus as claimed in claim 1, wherein said outer rotatable sleeve has an axial slot therein to facilitate the axial movement of said fingers.
3. Apparatus as claimed in claim 1, wherein said endless came tracks are so formed that during rotation of said sleeve, the spaced relationship of said fingers is firstly increased and then decreased.
4. Apparatus as claimed in claim 1, wherein movement of said rotatable sleeve is unidirectional.
5. Apparatus as claimed in claim 1, wherein said fingers are each provided with an arcuate outer dough-receiving surface.
6. Apparatus as claimed in claim 1, wherein said fingers have bifurcated ends so as to be capable of arcuate adjustment relative to said sleeve.
7. Apparatus as claimed in claim 1, wherein said outer sleeve is driven by means of an electric motor.

References Cited
UNITED STATES PATENTS

| | | | |
|---|---|---|---|
| 2,166,159 | 7/1939 | Kellner | 107—68 |
| 2,342,270 | 2/1944 | Harbor | 107—7 XR |
| 2,545,667 | 3/1951 | Malnati | 83—110 |
| 2,801,727 | 8/1957 | Malnati | 198—34 |
| 2,856,060 | 10/1958 | Malnati | 198—34 |

WALTER A. SCHEEL, *Primary Examiner.*

A. O. HENDERSON, *Assistant Examiner.*

U.S. Cl. X.R.

198—34